(12) United States Patent
Folgner et al.

(10) Patent No.: US 10,642,465 B2
(45) Date of Patent: May 5, 2020

(54) METHOD AND SYSTEM FOR MEDIA SELECTION AND SHARING

(71) Applicant: Twitter, Inc., San Francisco, CA (US)

(72) Inventors: Michael George Folgner, Burlingame, CA (US); Ryan Brice Cunningham, San Francisco, CA (US); Stephen Benjamin Weibel, San Francisco, CA (US); Lamthuy Tran Nguyen, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 14/846,508

(22) Filed: Sep. 4, 2015

(65) Prior Publication Data

US 2015/0378584 A1 Dec. 31, 2015

Related U.S. Application Data

(63) Continuation of application No. 13/273,163, filed on Oct. 13, 2011, now Pat. No. 9,129,641.

(Continued)

(51) Int. Cl.

| | |
|---|---|
| *G06F 3/0484* | (2013.01) |
| *G06F 3/0482* | (2013.01) |
| *G11B 27/34* | (2006.01) |
| *H04N 21/658* | (2011.01) |
| *H04N 21/4545* | (2011.01) |
| *H04N 21/414* | (2011.01) |
| *H04N 21/2743* | (2011.01) |
| *G11B 27/034* | (2006.01) |
| *G06Q 50/00* | (2012.01) |

(Continued)

(52) U.S. Cl.
CPC ........ *G06F 3/04847* (2013.01); *G06F 3/0482* (2013.01); *G06F 3/04842* (2013.01); *G06Q 10/10* (2013.01); *G06Q 30/02* (2013.01); *G06Q 50/01* (2013.01); *G11B 27/034* (2013.01); *G11B 27/34* (2013.01); *H04N 21/2743* (2013.01); *H04N 21/41407* (2013.01); *H04N 21/4545* (2013.01); *H04N 21/658* (2013.01)

(58) Field of Classification Search
USPC ................................. 386/200–234, 239–248
See application file for complete search history.

(56) References Cited

U.S. PATENT DOCUMENTS

| | | |
|---|---|---|
| 590,584 A | 9/1897 | McKeone |
| 6,590,584 B1 | 7/2003 | Yamaura |

(Continued)

FOREIGN PATENT DOCUMENTS

EP 1 921 854 A1 * 5/2008 ........... G06T 3/4092

Primary Examiner — Hung Q Dang
(74) Attorney, Agent, or Firm — Brake Hughes Bellermann LLP

(57) ABSTRACT

A method and system for media selection and sharing is disclosed. According to one embodiment, media content is received from a media source and is stored in a buffer for a first time period. A second time period within the first time period is determined for creating a media clip from the media content stored in the buffer. A media clip is generated as determined by the second time period. A user provides an input, and the user's input is associated with the media clip to take one or more effects on the media clip. The media clip enhanced with the one more effects is transmitted over a network to share with other users.

24 Claims, 5 Drawing Sheets

Related U.S. Application Data

(60) Provisional application No. 61/393,789, filed on Oct. 15, 2010.

(51) Int. Cl.
  *G06Q 30/02* (2012.01)
  *G06Q 10/10* (2012.01)

(56) References Cited

U.S. PATENT DOCUMENTS

| | | | |
|---|---|---|---|
| 8,713,191 B1* | 4/2014 | Hallock | H04M 19/04 709/231 |
| 2004/0216173 A1* | 10/2004 | Horoszowski | G06F 17/30796 725/145 |
| 2005/0172319 A1* | 8/2005 | Reichardt | G11B 27/105 725/52 |
| 2005/0257137 A1 | 11/2005 | Weber et al. | |
| 2007/0198532 A1* | 8/2007 | Krikorian | G06Q 30/0273 705/14.69 |
| 2007/0204310 A1 | 8/2007 | Hua et al. | |
| 2007/0223871 A1* | 9/2007 | Thelen | G11B 27/105 386/280 |
| 2008/0046922 A1* | 2/2008 | Jankins | H04N 7/17318 725/35 |
| 2008/0086779 A1 | 4/2008 | Blake et al. | |
| 2008/0247726 A1 | 10/2008 | Lee et al. | |
| 2008/0312010 A1 | 12/2008 | Marty et al. | |
| 2009/0092374 A1 | 4/2009 | Kulas et al. | |
| 2009/0157697 A1* | 6/2009 | Conway | G11B 27/00 |
| 2009/0158337 A1* | 6/2009 | Stiers | H04N 5/44591 725/44 |
| 2009/0198794 A1* | 8/2009 | Beals | H04N 21/2743 709/219 |
| 2010/0107080 A1 | 4/2010 | Bentley et al. | |
| 2011/0028083 A1* | 2/2011 | Soitis | G11B 27/10 455/3.06 |
| 2011/0150214 A1* | 6/2011 | Gleim | H04L 9/0822 380/200 |
| 2012/0030587 A1* | 2/2012 | Ketkar | G06F 17/30038 715/751 |
| 2012/0066059 A1* | 3/2012 | Berger | G06Q 30/0277 705/14.49 |

\* cited by examiner

METHOD AND SYSTEM FOR MEDIA SELECTION AND SHARING

CROSS-REFERENCE TO RELATED APPLICATIONS

This present application is a continuation application of U.S. patent application Ser. No. 13/273,163, entitled "Method and System for Media Selection and Sharing" and filed on Oct. 13, 2011, which claims priority to U.S. Provisional Patent Application No. 61/393,789, entitled "Live Media Asset Selection From a Secondary Device" filed on Oct. 15, 2010, the disclosures of which are incorporated by reference in their entirety, for all purposes, herein.

FIELD

The field of the invention relates generally to content sharing over a network, and more particularly to a method and system for live media selection and sharing.

BACKGROUND

Social networking provides an efficient means of communication among friends, family, coworkers, and even with the general public. Social networking is becoming increasingly popular because it provides a unified platform for socializing with other people in a way that never existed. Thanks to recent technological developments, users can more easily connect to social networking sites from using their mobile devices such as smart phones, tablets, set-top boxes, and televisions. For their convenience, accessibility to rich and diverse content, and entertainment, social networking sites are replacing conventional forms of communication such as newspapers, radios, television, publishing, and emails. This opens up a new business opportunity for advertisers, content owners, and social networking companies.

Users of social networking sites or services access and watch multimedia clips, live TV shows or dramas, sporting events, and movies provided by media providers as well as user-created-content (UCC) that other users have created. Those users may desire to share media clips or points in time of media clips as they watch them. For example, social networking users often have reactions to live television broadcast that they watch and desire to share messages about the moment with others within a social network with a specific reference to their comments and a link to the media clips. On the other hand, content owners such as broadcast networks, advertisers or users who created their own content, may desire to allow others to share a short segment of their content in specific terms and conditions over social networks. Such media sharing and commenting over social networking sites can further facilitate users' communication and enhance user experience of exchanging comments and sharing the media.

Conventional image/video capturing from a media source requires specialized equipment. The users need to manually edit media files using client editing software such as Avid or Final Cut—to create a clip and upload captured clips to social networks or video hosting sites. Usually, unauthorized use of content, although the content is available in public, violates copyright because rights have not been negotiated with the content owner for such a use and the user often has no relationship with the content owner. Users post comments in social networks with reference to time codes or video segments as they view live video. Other users view the referenced video but the users' comments do not automatically link to the point in time of the referenced clip.

SUMMARY

A method and system for media selection and sharing is disclosed. According to one embodiment, media content is received from a media source and is stored in a buffer for a first time period. A second time period within the first time period is determined for creating a media clip from the media content stored in the buffer. A media clip is generated as determined by the second time period. A user provides an input, and the user's input is associated with the media clip to take one or more effects on the media clip. The media clip enhanced with the one more effects is transmitted over a network to share with other users.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
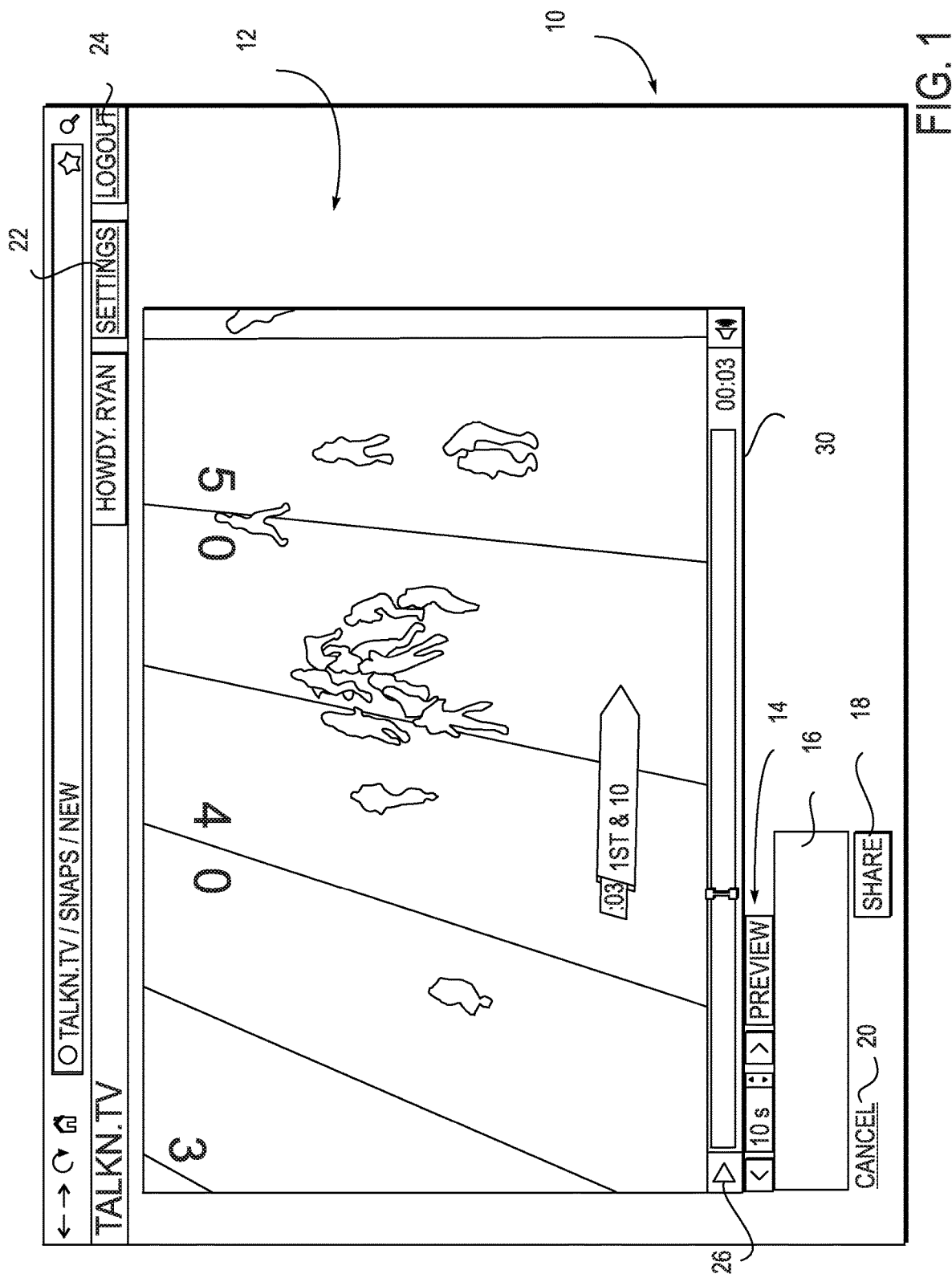
FIG. 1 illustrates a schematic view of an exemplary user interface for capturing media, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for media selection and sharing is disclosed. According to one embodiment, media content is received from a media source and is stored in a buffer for a first time period. A second time period within the first time period is determined for creating a media clip from the media content stored in the buffer. A media clip is generated as determined by the second time period. A user provides an input, and the user's input is associated with the media clip to take one or more effects on the media clip. The media clip enhanced with the one more effects is transmitted over a network to share with other users.

Each of the features and teachings disclosed herein can be utilized separately or in conjunction with other features and teachings to provide a method and system for live media selection and sharing. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Existing techniques and systems for media capture raise copyright issues because rights cannot easily be negotiated for use of captured clips within social networks. The present method and system allows content owners to assign rights and rules to the clips at the time of posting or delivery at a detailed level. Users who desire to share the entire or a portion of media clips can identify clips are allowed for sharing identifying the rights assigned by content owners. Based on the allowed content rights, users can share media clips. The present system and method provides a tool for capturing, previewing and publishing media clips without having to buy, configure, and use specialized media capturing equipment.

The current television equipment and infrastructure does not allow the user to easily share specific points in time or clips from what they are watching. It is an objective of the present system and method to provide users a tool to reference a clip that they are viewing and attach a comment, rating or other metadata, and receive the user's action. The user's action may be received from a hand-held device, for example, a remote control, mobile phone, etc. These users' reactions can be informational, emotional, or even physical. The comments and/or actions by the user are integrated into the captured video clip to facilitate communication of their interest in and reaction to specific media clips with other users in social networks or by email.

The present subject matter allows a user to select a snapshot or a portion of media clips (e.g., video and/or audio clips) and share them with other users. In one embodiment, the media clip selection and sharing is provided by an application running on a mobile device or other secondary device that is capable of viewing, editing and/or transmitting the selected media clip to other devices or servers of a social networking site. The shared media clips may be accompanied by a user's comment, a reference or hyperlinks to other videos or photos, a rating or a feature resulting from a physical action taken by the user. For example, the user's physical action includes a physical throwing gesture with a mobile phone producing a graphic on the clip of an object being thrown at the clip, such as a tomato.

An example of a user's action for generating a snap or marking a time point for a snapped media clip is swinging his or her mobile phone. A user watching a sports game can post a snapshot of the sports game or generate a data point when they swing the mobile phone. Another example is swinging the mobile phone towards the television screen and then back in a "fishing cast" motion to send an email to a designated email address. The designated email address may be used for previewing the captured media clip and/or add a comment before forwarding or sharing with others.

According to one embodiment, the present subject matter is coupled with a content rights system that allows varying rights levels and features to be specified as to how the shared clips are viewed or used by users in different geographies and in different time windows.

According to one embodiment, a media selection and sharing device provides media capture and slicing capabilities and allow sharing the selected media clips with other users. The device captures a television signal or externally encoded video streams provided by content distributors. For example, those captured media clips are live news or sport events, or video clips hosted by a content distribution Web site such as Hulu® and You-Tube®. The captured signal is encoded to a user-specified format. The user-specified format may be different from the generic format of the original media clip such that format conversion is required from the generic format to the user-specified format. In another embodiment, the user-specified format is a compression format. In yet another embodiment, the media clip is converted into multiple compression formats. The converted compression formats may be optimized for distributing to various social networking sites and other types of devices, or streaming data over various bandwidth situations.

After the media clip is captured, the device buffers and compresses the media clips for a specified duration including a date and time value into a local disk or a storage medium such as a Web storage. In response to a user's action or command input, the device creates a virtual clip or a separate video file from the buffer as specified by the date/time value with a time marker. The user's input is a gesture, an emotional, a voice input, a physical action, or a click of a button on a user interface, or any other inputs identifiable by the user device.

Figure 5:
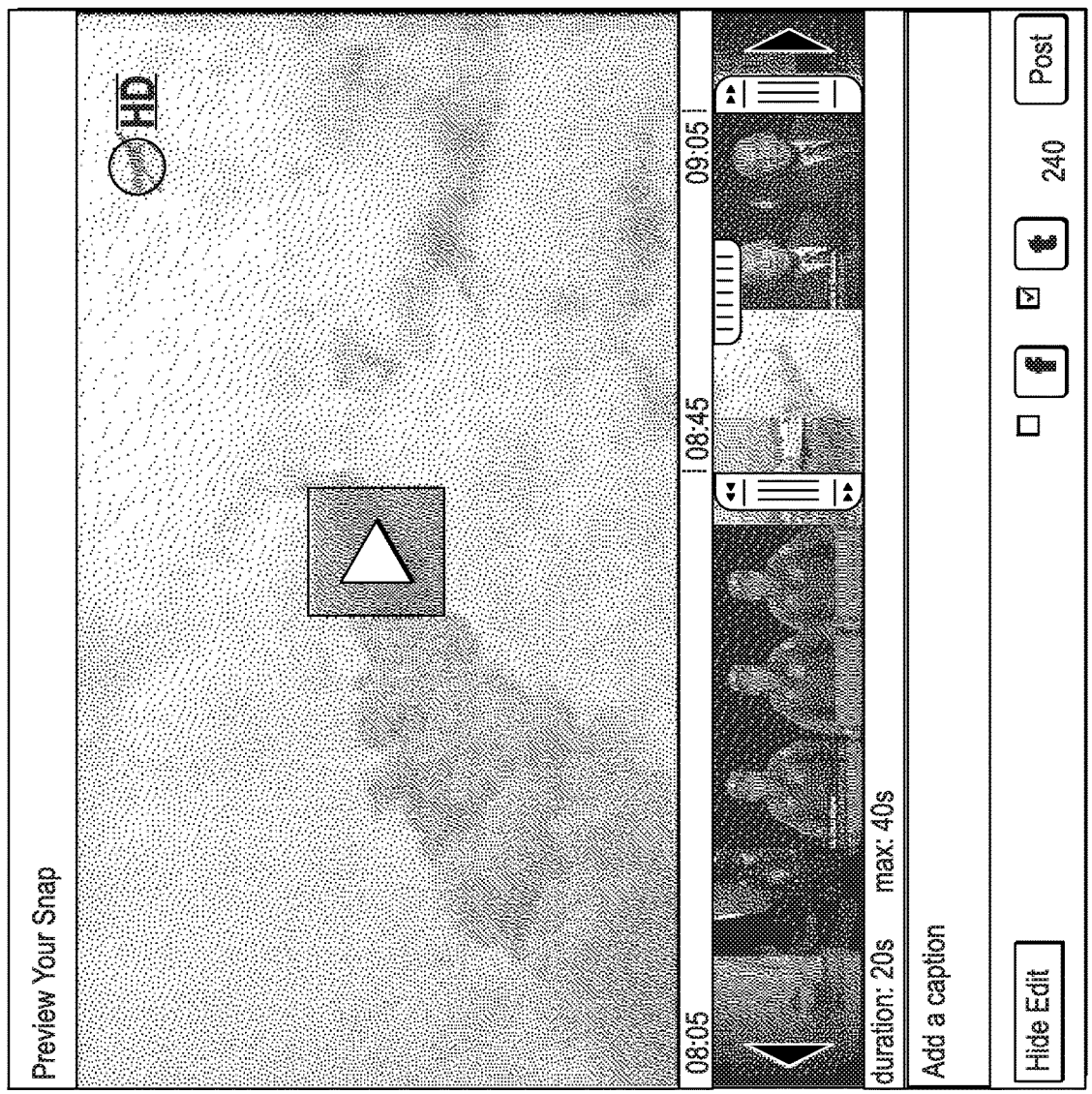
FIG. 5 illustrates an exemplary user interface allowing a user to select a frame image and specify duration, according to one embodiment.

For example, the user watching a soccer match on his television set see a goal, and presses a button on his mobile device, enter a comment, or take a physical action to generate a time marker. The user could then optionally edit the time marker to select a different moment prior to sharing the video clip. There are a number of interfaces to select a media clip, including marking in- and out-points on a timeline. A user can take a video of a predetermined duration from the buffer, for example the last 20 seconds, from the moment when the user clicks a "snap" button. In yet another example, the user selects a section of partial thumbs. Referring to FIG. 5, the user can select a first frame image and specify duration, scroll through first frame images by dragging or swiping, and click a "post" button to transmit the selected virtual clip. Those skilled in the art would understand that there are a variety of ways to specify time markers and select a virtual clip from a buffer.

The time marker may reflect the date and time of the newly crated virtual clip or the date and time of the original media clip. In the former case, the device automatically adjusts the time marker to match average encoding time delay.

In one embodiment, the user starts the media capturing application, or clicks a link in a web page to select a media for capturing from available sources. The user viewing the media on a computer or mobile device clicks on a button or enters a comment on within or on the video player. The video player generates a signal to process the received user's input. Various gesture recognition techniques may be used to recognize user's actions. For example, the user's gesture of swings the device is used to trigger the "snap" action using an accelerometer. The start and end times may be defined by the content owner or the system, or by the user who snaps the video clip. For example, the user could select the starting and ending frames of the desired video clip from a show he is watching on television on his mobile phone. The start time and the duration may be set by user-specifiable values, for example 20 seconds, measured backward from the snapped action. In another implementation, the initiation of the swinging could mark the start time and the cessation the end time. The real-time accelerometer data may be used against reference data of a machine learning algorithm that can be configured to train the pattern of the user's action to produce a machine recognizable signal. The user's second gesture may trigger transformation of the selected clip, for example, an overlay of a tomato thrown at the currently playing clip.

The last known clipping parameters may be used or the user may change them before posting a new clip. For example, a user's app on his/her mobile phone may be set to "CNN News" for the title at the start of a snap, but the user can change it to "MTV" assigning a different set of metadata to the video before posting it.

According to one embodiment, the present media selection and sharing system and method provides a media content management capability. The device associates the newly created virtual media clip with metadata including schedule information (e.g., date, time, duration, title, description, station, cast, genre, etc.). The association of the schedule information with the media clip may occur before but preferably after the encoding of the media clip.

As a part of the information association, the content owner is allowed to further associate cascading rights to the media clip. The cascading rights define the level of access to the media clip by users: global, network/channel, station, program, schedule, broadcast window. Global right means that other users can access the media clip with no temporal restrictions. Network/channel right allows unlimited access to the media clip as long as other users have access right to the network and/or channel to which the media clip belongs or the media clip belongs to a certain network/channel that provides unlimited access to the users. Similarly, station right allows users to access the media clip when the media clip belongs to a certain station or users have access right to the station.

For example, such network/channels are Websites that have restricted membership to paying users. A channel can be a series of TV programs or a series of events from other sources, with or without gap in scheduling. Program right allows users to access the media clip if the media clip is captured from a certain program. Schedule right limits access to the media clip for a predefined duration whereas broadcast window right allows access only for a limited duration of broadcasting or a limited time from the broadcasting.

According to one embodiment, information association can impose access restriction to the media clip geographically as well as viewing time and time zone. For example, the media clip can be configured to allow access to users connecting from U.S. territory. Access to the media clip may be restricted by the origination, i.e., domain name of the access request, other location services such as IP to geographic lookups, or by collecting location data from the device the media clip is used on.

According to another embodiment, a delay restriction by time zone may be added to the information association. The page or embedded viewer takes into account geographical and time rights restrictions. For example, a media clip currently viewable in the East Coast cannot be viewed on the West Coast until 3 hrs after capturing the media clip.

The metadata contains clip duration information. By default, minimum and maximum values are specified. Maximum value of zero indicates no capturing is allowed for the image or video clips being played on the user's window. For programs aired previously, a time window can be specified to allow a user to capture within a predefined duration since the program first aired. Other social actions such as user's physical gestures and sharing in social networks may be associated to the media clips for distribution and sharing as the content distributor or owners intend.

The information association may be used to implement an advertising system. Depending on the playing time and location, or any other associated information, the media clip may be played with an embedded advertisement The user can associate a preferred station information to the captured media clip. When no user selection of a preferred station is specified, a global default station is selected. Alternatively, the station information may be fed from an analysis of the user behavior or data. For example, a "popular now" station may be added as a station information. The "popular now" station may be the station that currently has the most snaps using a snap count as an indicator of popularity. Many other techniques exist to analyze real-time data (e.g., hash-tag counts in twitter data over a specified time period) to select the popular station.

In other embodiments, the associated information may be updated with near-live audio/video signatures by a specified station, network/channel or program. An audio signatures service such as Into Now and Shazam or an image signatures service such as TvTak may be used to identify the media that a user is watching. The information association could integrate one of these signature services to provide semi-automatic selection of a media source and station. The integrated service may be implemented in an application running on a mobile phone or a portable device.

The last channel that the user selected is selected by default or the user is presented with a popular source at the time of log-in based on other users' snapping counts. The snapping feature may incorporate other features. For example, an audio fingerprint is captured from the user's device and matched against available live audio/video sources to automatically select the source.

According to one embodiment, the present media selection and sharing device captures the user's snap action and records the snap time. The user provides association information to the captured media clip, otherwise default information is associated with the snapped media clip. After the information association is complete, the user is presented with a preview clip or image and alternatives from other stations. The alternatives would be alternative snaps or image previews so that the user could choose based on visually recognizing what image was on the user interface. The user is allowed to select the current station, save the station information to the user data, and re-present the station information in a preview. The user is also allowed to adjust the captured clip by moving in-point, out-point and duration. The adjusted information may be previewed repeatedly. The user then enters comments in a text field. The user clicks on the share button to publish and share in a social networking system.

Due to the restricted access rights to certain media clips, the user is allowed to select only a permitted image for sharing based on his/her right to the current audio/video source. The video clips that the user selects include popular or suggested clips by the system or clips created by other users subscribing to the service.

According to one embodiment, the present media selection and sharing device connected to a social sharing system such as Twitter®, Facebook®, and Linked In®. The user identifier, user text, and media information is transmitted from the device to the social sharing system. By doing so, the user is allowed to configure sharing of media clips with other users on the social networking sites. The receiving social sharing system creates an entry for user text and media as described by the user-provided media information. For example, the social sharing system creates a URL where the user can preview the text and media information. Once satisfied with previewing, the user posts user text and the URL with an snapping action. The snapped media clip is posted in association with the user-provided text and URL to the designated social networking sites.

In one embodiment, the media snapping and posting is performed by an application program or a web browser—collectively referred to as a client program. The client program provides a user interface for receiving the user's snap action and viewing. The client program additionally may collect audio signatures from the device to send to a user-specified station. It is possible to receive the user's action by analyzing the user's physical action. To receive the use's action, the user interface allows the user to select a virtual item using a pointing device or touch screen or virtual physical action.

In one embodiment, a user's single action produces multiple effects on a media clip including selection of a station as well as an action to take on the snap. The user selects a channel from a list of channels on the user interface. In addition, the user selects an image representing a special effect. For example, an example of an action is "throwing at the screen" and the selected image is a "tomato." When the user generates a snap based on the throwing action, a splatting tomato is overlaid on the produced media clip. When other users view the media clip, they see the tomato effect overlaid on the media clip.

In one embodiment, the user receives an offer or call to action, such as a discount on a product that is related to the captured media content. The related media content may be an advertisement.

The present system and method provides analysis on the real-time counts of users' snaps. For example, a histogram of representing users' total snap counts within a scheduled time is obtained. In determining the snaps to be returned, the user specifies a threshold count. All snaps' URLs or data that exceed the threshold count are returned to the user. These events exceeding the user-specified threshold count are viewable in an application (e.g., in a "highlight" of the event section), web site, or by an email once the event is over. Relevant data for a user-specifiable event identified by a search term (e.g., "sports event" including baseball, football, soccer, golf, ice hockey, etc.) may aggregate twitter data as well as with the snap count for that event. In one embodiment, the top ten most snapped (by histogram time) URLs are returned to the user.

According to one embodiment, the count data resulting from users' social actions on media objects are calculated. A user clicks "snap" to start an application program, clicks a web browser bookmark, or any other action that indicates and mark the current time. The "snap" is referred to a clickable button in of the user interface that marks the time that it is pressed and then proceeds to editing before sharing. A "snap" function may be incorporated into another feature, for example, a user's physical action of swinging. A "snap" may automatically occur when the user starts typing a comment while viewing a media object. The user selects from available sources (e.g., television channels) by viewing title and description data, and optionally showing a thumbnail image or a short video clip. The user adjusts the selected media clip in-point and out-point times to specify the exact clip he or she desires to capture. The user optionally adds text to attach to the sharing action. The user clicks a "share" button to send the captured media clip to a social network site along with the text and a link to a page that will play back the specified clip.

According to one embodiment, users are provided with auto-generated clips based on their popularity. The auto-generated of most snapped clips or the users' activities on those clips, such as view counts, the number of tweets or "likes" in social networks, or other metadata of the shared clips. Such metadata are updated on a per source programming basis. For example, the top 10 clips are presented to user based on the number of users who snapped a common section of the clips or total counts of snaps.

According to one embodiment, other users "re-snap", "like", comment, or take another action on the same clip that another user acted on to add their own text and/or share to their social networks.

The present system and method in conjunction with social networking features provides an interactive service that facilitate ease of media sharing and communication. It allows a user to browse web sites, and snap to start the client application. For a newly registering user, the application invites the user to join the service and link to his/her other social networking sites, and optionally saves the user's credentials for auto-linking without needing to re-login to the associated sites.

In one embodiment, the user browses on a mobile version of the interactive service. The client Application is downloaded to the user device (e.g., mobile phone, computer, tablet PC). The client application can be started by selecting a channel or a show, or by clicking "snap" from a website, in other applications, or a set-top box menu. The device entering the user's snap action may be a different from the device that provides the interactive user interface. For example, a set-top box provides the user interface, but the remote control of the set-top box receives the user's physical action for signaling the snapping action. In other examples, the same device such as a mobile phone provides the user interface and receives the user action.

The present system and method allows a user to select and publish content or a portion of content from live audio/video sources. For example, students can take "video notes" in a school lecture and creates highlights or summary of the lecture. In other examples, participants of conferences, concerts or other events to capture a video clip to share with others in a social network. It can also be used for live sporting events. A user live viewing experience can be systematically shared via an embedded video source capturing on social networks.

The present system and method allows a user to create a highlight reel from a continuous audio/video source such as a surveillance camera in a person's living room or backyard. The recorded audio/video clips are marked with moments of interest with comments. In one embodiment, the comments may be automatically inserted by analyzing the captured video. In the example of the surveillance camera, a sudden appearance of a person at the front door can be automatically commented for the home owner's later viewing. The person appearing can be automatically recognized using a face-recognition software. When no particular events occurs, the recoded video clips are overwritten with newer clips, and only the clips with comments are saved. The user can also manually remove the reviewed clips.

Video sources such as webcams may be used to provide video channels. The webcams registered in the network streams videos to a central server. In one embodiment, geo-location information for the webcams is used in an application. In this case, "snap by location" automatically connects a user to the geographically closest camera or select a webcam for streaming from a list of the webcams. In another embodiment, the video sources may be users' mobile device with a camera. In this case, the user's location is streamed to the server along with the streaming video. A party-thrower adds a webcam and broadcasts video streams to the party-goers, When a user notices the guy falling on a table, the user pulls out his mobile phone, connects to the server, selects the moment, and posts the webcam footage of the guy falling on the table with a comment "omg, @jimjones just broke the table at the @jerrymack party!." The user posts the snapped webcam footage on a social networking site or shares it with others via MMS or email.

According to one embodiment, a user's composite action is received to provide multiple effects. For example, the user's gesture to throw a tomato at the screen during a live comedy viewing creates a clip of the video overlaid with a tomato animation.

FIG. 1 illustrates a schematic view of an exemplary user interface for capturing media, according to one embodiment. User interface 12 contains a display area 12 playing a live football game. User interface 12 may be displayed on a television, personal computer, tablet PC, mobile phone, or any other display capable of receiving a television signal. User interface 12 may be provided to the user over a Web browser or on a web application. User interface 12 provides various functions enabled by clickable buttons including preview button 14, comment area 16, share button 18, cancel button 20, settings button 22, logout button 24, and play button 26. The video of the live football game is stored in a rolling buffer for a predetermined duration, for example, 30 seconds. By default, the rolling buffer is continuously capturing the live football game until the user clicks on play button 26. When the user clicks on play button 26, the video Of the football game is replayed as if an instant replay. During the replay, the rolling buffer is not being updated. Timeline 30 provides a two timer markers, i.e., start time, and end time. The user positions the start and end time markers to create a video clip of the captured football game.

Figure 2:
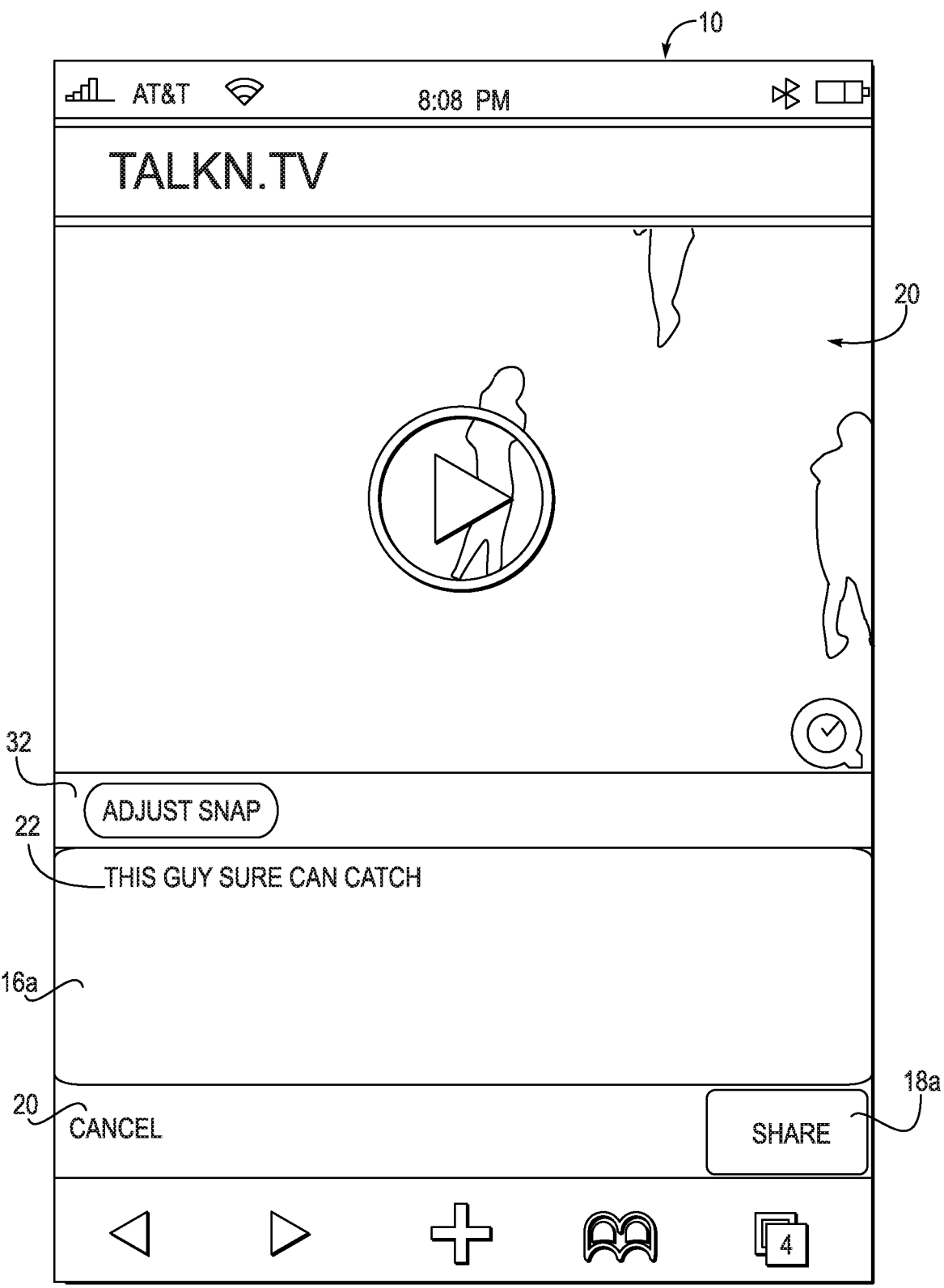
FIG. 2 illustrates a schematic view of an exemplary user interface running on a mobile phone, according to one embodiment.

FIG. 2 illustrates a schematic view of an exemplary user interface running on a mobile phone, according to one embodiment. After the video clip is created, the user is given an opportunity to preview. Display area 12 is turned into a recipient screen 20 with an overlaid play button. The user is able to preview, replay, as well as adjust the start and end time markers. If not satisfied, the user can cancel by pressing cancel button 20, click on adjust snap button 32 to recapture another video clip from the rolling buffer, or return to the live football game. The user can also add a comment by entering text in a comment area 22. When satisfied, the user clicks on share button 18 to publish the video clip with the comment on a designated social networking site.

Figure 3:
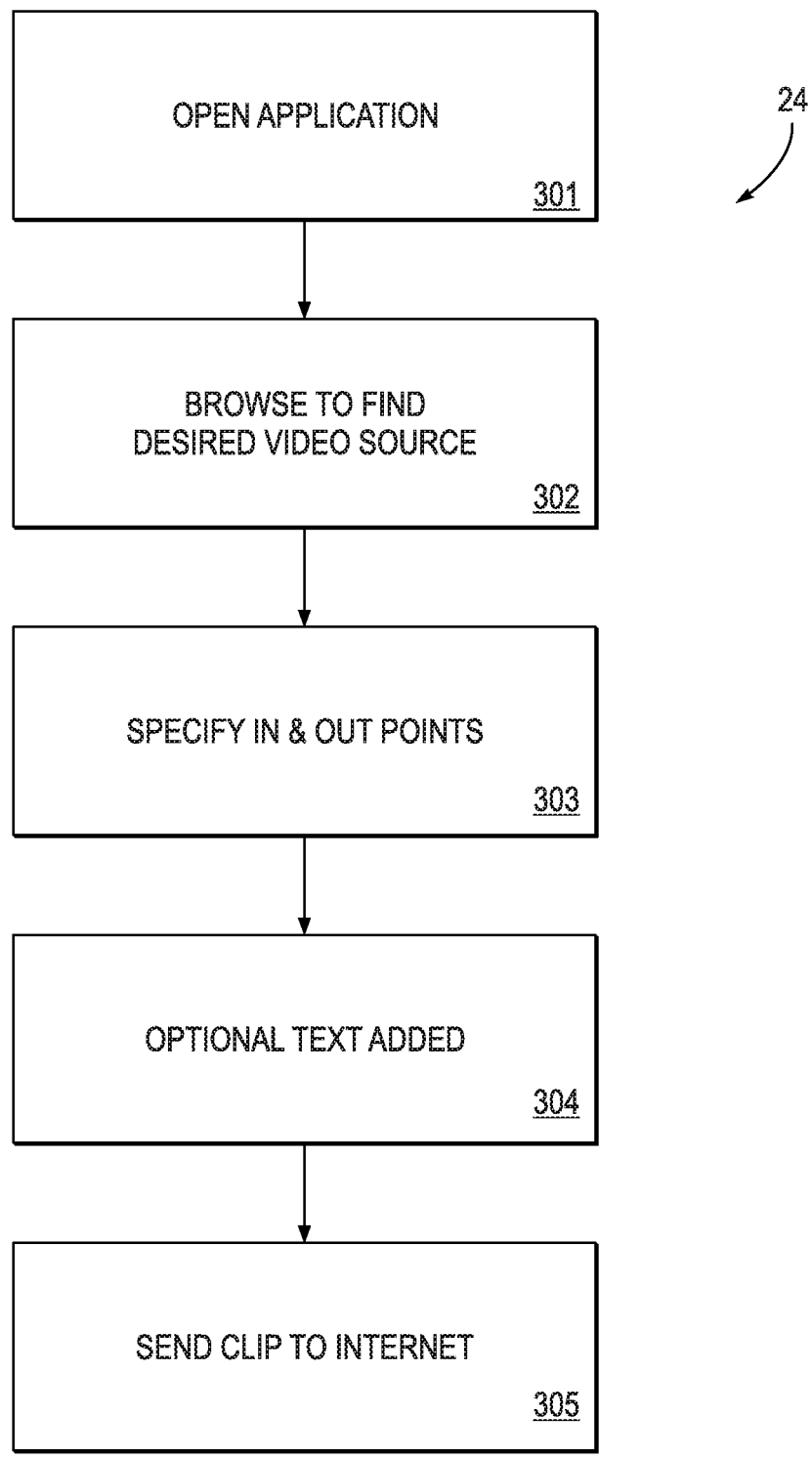
FIG. 3 illustrates an exemplary flow chart for capturing a media clip, according to one embodiment.

FIG. 3 illustrates an exemplary flow chart for capturing a media clip, according to one embodiment. A user starts an application (301). The application may be a Web browser or an application program running on a personal computer, a mobile device such as a mobile phone, a tablet PC, etc. The application displays various media sources, and the user selects a media source, for example, a live sport event (302). While watching the media source, the user specifies in and out points (303) to create a video clip. The in and out points may be defined by timeline 30 as in the example of FIG. 2. Once the in and out points are specified, the user optionally enters a comment (304). Finally, the user sends the video clip integrated with the entered comment (305). The video clip is hosted by a social networking site to share with other users.

Figure 4:
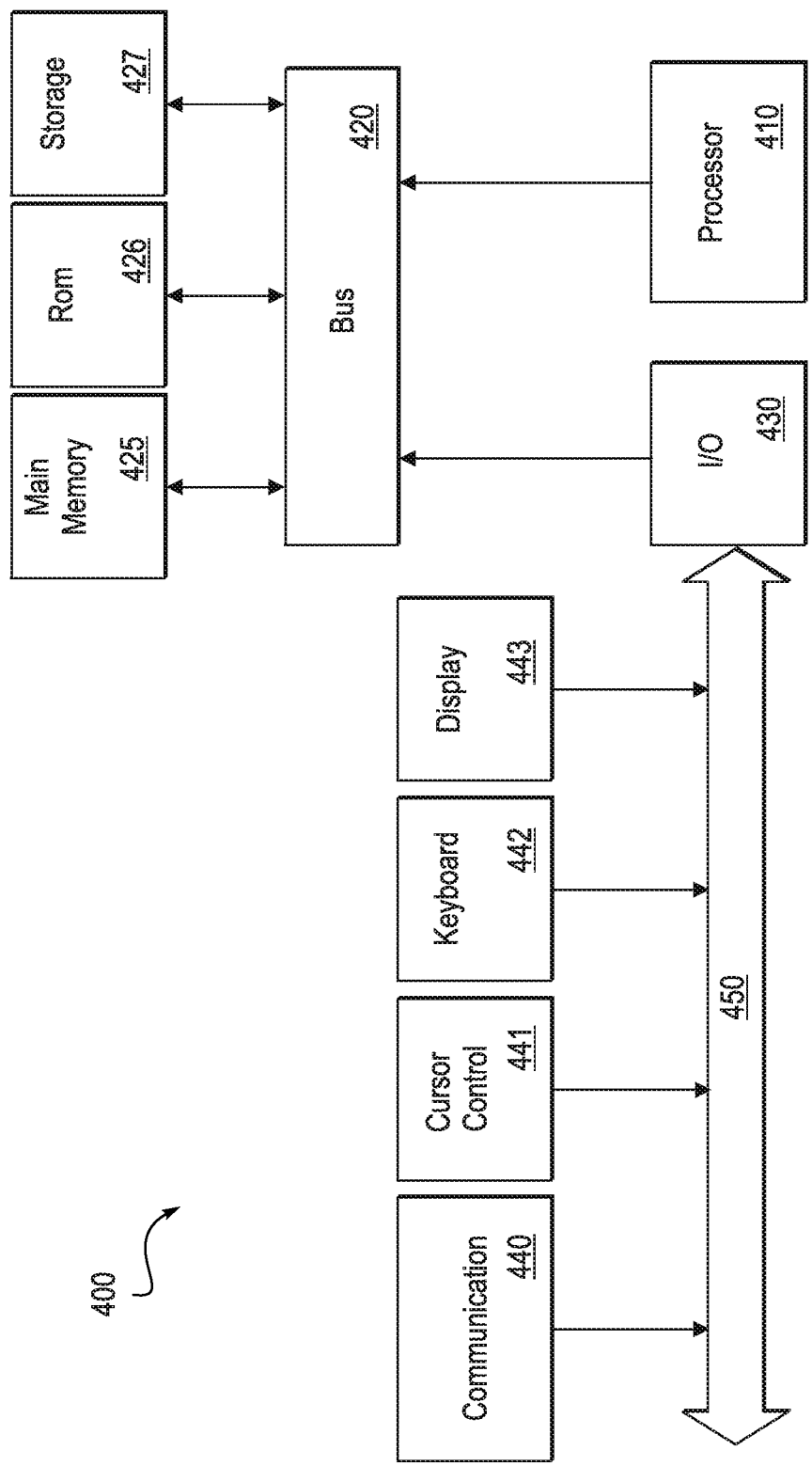
FIG. 4 illustrates an exemplary computer architecture for use with the present system, according to one embodiment.

FIG. 4 illustrates an exemplary computer architecture 400 for use with the present system, according to one embodiment. Computer architecture 400 may be used to implement an online referral system with all or a part of the components shown in FIGS. 1 and 2. One embodiment of architecture 400 comprises a system bus 420 for communicating information, and a processor 410 coupled to bus 420 for processing information. Architecture 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Architecture 400 also may include a read only memory (ROM) and/or other static storage device 426 coupled to bus 420 for storing static information and instructions used by processor 410.

A data storage device 427 such as a flash memory, a magnetic disk or optical disc and its corresponding drive may also be coupled to computer system 400 for storing information and instructions. Architecture 400 can also be coupled to a second I/O bus 450 via an I/O interface 430. A plurality of I/O devices may be coupled to I/O bus 450, including a display device 443, an input device (e.g., an alphanumeric input device 442 and/or a cursor control device 441).

The communication device 440 allows for access to other computers (servers or clients) via a network. The communication device 440 may comprise a modem, a network interface card, a wireless network interface or other well known interface device, such as those used for coupling to Ethernet, token ring, or other types of networks.

Although the preferred embodiments of the present invention have been illustrated and described in detail, it will be readily apparent to those skilled in the art that various modifications may be made therein without departing from the sprit of the present invention or from die scope of the appended claims.

We claim:

1. A computer-implemented method, comprising:
   receiving, by an application running on a mobile device, user input related to content being broadcast and displayed by a display device, the content being displayed without input from the application, wherein the mobile device and the display device are not simultaneously displaying the content being broadcast at the time the user input is received, the user input including selection of a source of the content being broadcast, the display device being operable to display the content being broadcast without requiring input from the mobile device;
   detecting, by the application in response to the user input, information specifying a portion of the content being broadcast based on accelerometer data corresponding to a detected movement of the mobile device;
   sending, by the application, the information to a server over a network, the sent information including the selected source;
   receiving, by the application over the network, a video clip from the server based on the information sent by the application, and at least one rule for sharing the received video clip, the received video clip having cascading rights assigned by an owner of the content being broadcast, the cascading rights defining:
      a level of access for sharing the video clip; and
      a level of access for accessing the shared video clip, the level of access including access based on location data from a device requesting access to the video clip; and
   triggering display, by the application, of a representation of the video clip on a user interface implemented by the mobile device, the representation being selectable for upload to a social media account on a social media server.

2. The computer-implemented method of claim 1, wherein receiving the user input also detecting the information specifying the portion of the content being broadcast based on inputs from a user using an audio recognition feature of the application, or a video recognition feature of the application.

3. The computer-implemented method of claim 1, sending the information to the server over the network including providing a location of the mobile device to the server to be used in generating the video clip.

4. The computer-implemented method of claim 1, the representation being selectable for preview of the video clip via the application.

5. The computer-implemented method of claim 1, further comprising displaying the video clip and the source associated with the content of the video clip using a social media application running on the mobile device in accordance with the at least one rule for sharing the video clip.

6. The computer-implemented method of claim 5, receiving user input including:
   receiving, by the application, a user generated comment associated with the video clip; and
   displaying the user generated comment with the video clip using the social media application running on the mobile device.

7. The computer-implemented method of claim 5, receiving user input including:
   receiving, by the application, user input corresponding to at least one of:
      a change in at least one of a start time marker or an end time marker of the video clip,
      an overlay on the video clip, or
      a user generated comment;
   altering the video clip based on the user input; and
   displaying the altered video clip using the social media application running on the mobile device.

8. The computer-implemented method of claim 1, wherein the at least one rule includes a period of time during which the video clip may be shared by the user.

9. The computer-implemented method of claim 1, wherein the at least one rule includes a geographic location from which the shared video clip may be viewed.

10. The computer-implemented method of claim 1, wherein the cascading rights includes at least one of
   global rights, allowing users to access the video clip, without temporal restrictions,
   network rights, allowing users having access to a network of the owner of the content being broadcast to access the video clip,
   station rights, allowing users having access to a set station to access the video clip,
   program rights, allowing users to access the video clip if the video clip is captured from a set broadcast program,
   schedule rights, limiting access of users to the video clip for a defined duration, or
   broadcast rights, limiting access of users to the video clip for a limited amount of time from broadcast of the content.

11. The computer-implemented method of claim 1, wherein the receiving of the user input including selection of a source of the content being broadcast includes a selection of a user-preferred station.

12. The computer-implemented method of claim 1, wherein the receiving of the user input including selection of a source of the content being broadcast includes a selection of a global default station.

13. The computer-implemented method of claim 1, wherein the receiving of the user input including selection of a source of the content being broadcast includes a selection of a popular station based on analysis of current data.

14. The computer-implemented method of claim 1, wherein the receiving of the user input includes receiving at least a portion of the user input using an audio recognition feature of the application running on the mobile device, the portion of the information received using the audio recognition feature including an audio signature identifying the source of the content being broadcast.

15. The computer-implemented method of claim 1, wherein the generating the information in response to the user input also includes generating information specifying a format of the specified portion of the content, the specified format being different from an original format of the specified portion of the content.

16. The computer-implemented method of claim 1, wherein
the sending the information to the server over the network includes sending information including metadata associated with the specified portion of the content, and
the receiving the video clip from the server includes receiving metadata associated with the video clip.

17. The computer-implemented method of claim 16, the sent metadata including at least one of schedule information, duration information, title information, description information, media source information, broadcast station information, genre information, one or more user comments, or one or more user ratings, and the received metadata including information related to the at least one rule.

18. A non-transitory computer readable medium having stored thereon computer-readable instructions, which, when executed by a processor, cause the processor to perform a method, the method comprising:
receiving, by an application running on a mobile device, user input related to content being broadcast and displayed by a display device, the content being displayed without input from the application, wherein the mobile device and the display device are not simultaneously displaying the content being broadcast at the time the user input is received, the user input including selection of a source of the content being broadcast, the display device being operable to display the content being broadcast without requiring input from the mobile device;
detecting, by the application in response to the user input, information specifying a portion of the content being broadcast based on accelerometer data corresponding to a detected movement of the mobile device;
sending, by the application, the information to a server over a network, the sent information including the selected source;
receiving, by the application over the network, a video clip from the server based on the information sent by the application, and at least one rule for sharing the received video clip, the received video clip having cascading rights assigned by an owner of the content being broadcast, the cascading rights defining:
a level of access to the video clip for sharing the video clip; and
a level of access to the video clip accessing the shared video clip, the level of access including access based on location data from a device requesting access to the video clip; and
triggering display, by the application, of a representation of the video clip on a user interface implemented by the mobile device, the representation being selectable for upload to a social media account on a social media server.

19. The non-transitory computer readable medium of claim 18, wherein receiving the user input also includes detecting the information specifying the portion of the content being broadcast based on inputs from a user using an audio recognition feature of the application, or a video recognition feature of the application.

20. The non-transitory computer readable medium of claim 18, sending the information to the server over the network including providing a location of the mobile device to the server to be used in generating the video clip.

21. The non-transitory computer readable medium of claim 18, the representation being selectable for preview of the video clip via the application.

22. The non-transitory computer readable medium of claim 18, the method further comprising displaying the video clip and the source associated with the content of the video clip using a social media application running on the mobile device in accordance with the at least one rule for sharing the video clip.

23. The non-transitory computer readable medium of claim 22, receiving user input including:
receiving, by the application, a user generated comment associated with the video clip; and
displaying the user generated comment with the video clip using the social media application running on the mobile device.

24. The non-transitory computer readable medium of claim 22, receiving user input including:
receiving, by the application, user input corresponding to at least one of:
a change in at least one of a start time marker or an end time marker of the video clip,
an overlay on the video clip, or
a user generated comment;
altering the video clip based on the user input; and
displaying the altered video clip using the social media application running on the mobile device.

* * * * *